United States Patent [19]
Nakamura et al.

[11] Patent Number: 5,364,655
[45] Date of Patent: Nov. 15, 1994

[54] SIMULTANEOUS DOUBLE SIDES POLISHING METHOD

[75] Inventors: Takao Nakamura; Nobuya Sekiyama; Tsuneo Kawai, all of Yokohama; Yoshiki Kato, Nishitama, all of Japan

[73] Assignee: Hitachi Ltd., Chiyoda, Japan

[21] Appl. No.: 838,319

[22] Filed: Feb. 20, 1992

[30] Foreign Application Priority Data

Feb. 20, 1991 [JP] Japan .................................. 3-26351

[51] Int. Cl.⁵ .............................................. H01F 10/02
[52] U.S. Cl. .................................... 427/129; 427/128; 427/132; 427/209; 427/240; 427/328; 427/443.2; 427/444
[58] Field of Search .................... 427/127–132, 427/48, 209, 240, 328, 443.2, 444; 428/900, 695, 694

*Primary Examiner*—Bernard Pianalto
*Attorney, Agent, or Firm*—Antonelli, Terry, Stout & Kraus

[57] ABSTRACT

A thin plate such as a magnetic disk substrate is rotatably placed in a hole of a carrier provided between upper and lower surface plates forming a dynamic pressure producing surface in a temperature-controlled polishing liquid. When the number of revolutions of the surface plates increases, the dynamic pressure effect of the polishing agent is produced between the surface-plate surface and the substrate surface so that the substrate is polished in the non-contact state with the surface plate. The substrate surface is polished by fine free abrasive grains in the polishing liquid flowing between the surface plate and the substrate to provide a high plane degree to which surface precision of the surface plate is transferred. The present invention makes employs a float polishing, and is particularly suit to surface polishing of a thin plate such as a magnetic disk substrate which resets a residual processed strain. A magnetic disk having an excellent surface state can be realized.

9 Claims, 6 Drawing Sheets

Ra: 0.22nm
Rmax: 3.07nm
Rp: 2.17nm

SIMULTANEOUS DOUBLE SIDES POLISHING METHOD

BACKGROUND OF THE INVENTION

The present invention relates to a simultaneous double side polishing and processing method for a substrate and processing apparatus, a polishing and processing method for a magnetic disk uses the same, a manufacturing method for a magnetic disk, and a magnetic disk. The present invention relates to a simultaneous double side polishing and processing method without polishing sags in the peripheral portion of a substrate, and particularly to a substrate processing method and processing apparatus suitable for manufacturing a high density magnetic disk that is superior in sliding characteristics such as head flying characteristic, CSS (Contact-Start-Stop) characteristic, etc. and having a high reliance.

The surface polishing of a plate-like substrate is a fundamental technique of polishing, which has been heretofore studied with respect to substrates for various applications. Here, a magnetic disk device used for an external memory of a computer will be described below as a typical example.

Figure 7:
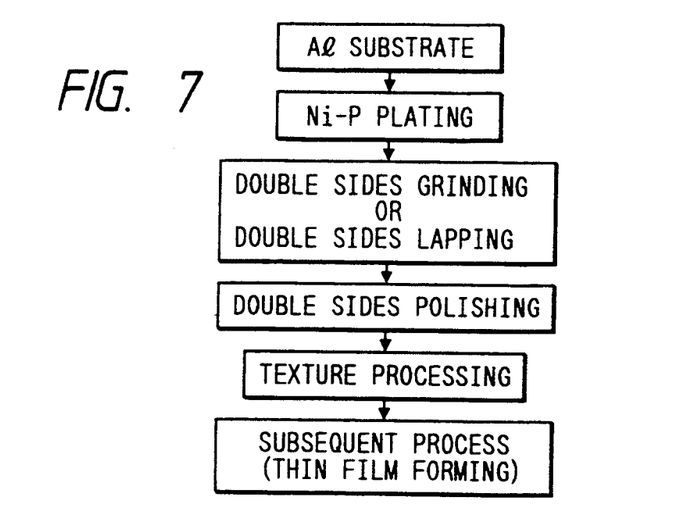
FIG. 7 is a view showing the steps of manufacturing a substrate for a magnetic disk.

As a substrate for a magnetic disk formed from a magnetic film formed by use of a film forming technique such as sputtering, plating, ion plating or the like, there has been used a substrate formed by applying a nickel-phosphorus (Ni-P) plating having a thickness of scores of μm as the undercoating film for the formation of a magnetic film to the surface of an aluminum alloy substrate, and applying double side grinding or double side lapping as shown as a process illustrates in FIG. 7 to said surface and further applying double side polishing processing using abrasive grains of various grain sizes thereto to finish the surface having the roughness in the range of 0.001 to 0.003 μm Ra, 0.005 to 0.020 μmR max. Thereafter, in order to avoid adhesion of a head at the time of the CSS drive as a magnetic disk device, a peripheral polishing process called texture process is applied to the surface to readjust the surface roughness to have 0.004 to 0.008 μm Ra.

The texture formed in the periphery of the substrate avoids the adhesion of the head as described above. In addition, this texture improves the magnetic characteristic of a magnetic film formed on the surface as discussed, for example, in "International Magnetics Conference (1987) GA02, GA03".

The magnetic disk is manufactured by the film forming processes employing for example a magnetic film, a protective film on the substrate in the processes as described above and further is post-processes to from a lubricating film.

Figure 8:
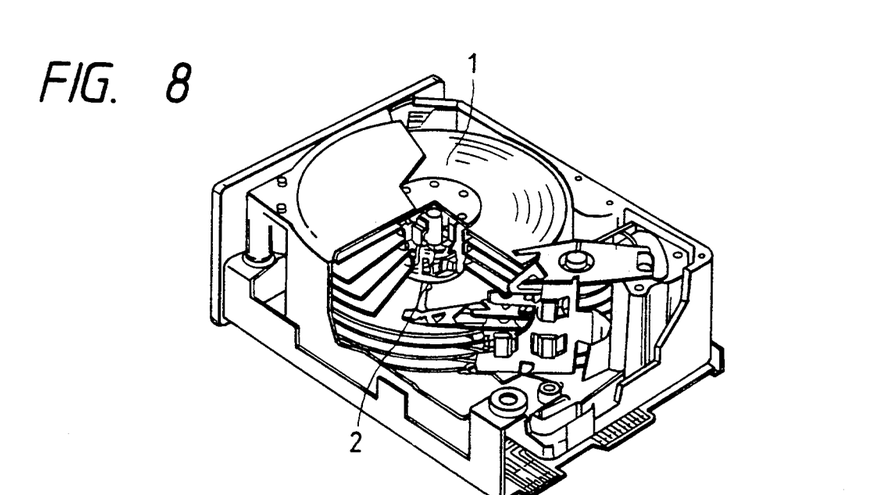
FIG. 8 is a partly sectional perspective view schematically showing a magnetic disk apparatus.

FIG. 8 is a partly cutaway perspective view of a magnetic disk device, in which a magnetic disk 1 is combined with a magnetic head 2 as shown to complete a magnetic disk device.

Figure 9:
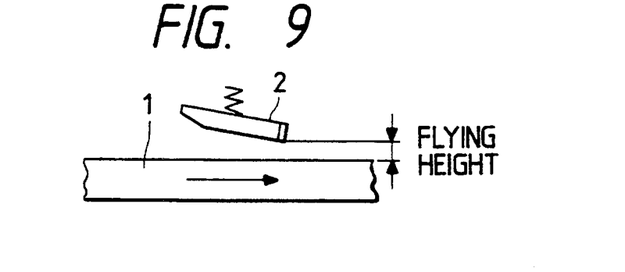
FIG. 9 is an explanatory view showing the relationship between a magnetic disk and a magnetic head when the magnetic disk apparatus is driven.

FIG. 9 is a schematic view showing a mode in which a magnetic head 2 flies on a rotating magnetic disk 1. In order to increase a recording capacity of the magnetic disk device, a flying height $H_{fly}$ of the magnetic head is very small, and the required height is from 0.2 μm or less to 0.1 μm or less. Particularly, the size of a fine projection Rp on the surface of the magnetic disk gives rise to a problem in the head's flying characteristic. The disk surface has been subjected to processing using a polishing tape or a head to decrease the fine projection. The surface roughness subjected to texture processing is less than 0.004 μmRa to a state close to the surface roughness subjected to polishing process.

The disk surface on which is conducted CSS characteristic test at a very low flying height has scratches resulting from polishing of a substrate. That is, there is a sliding defect resulting from a fine raised portion of a groove shoulder portion of the scratch. When the defect is large, a head crush results. From the foregoing, with a magnetic disk for high density recording, it is necessary to further decrease the head flying height. To this end, it is necessary to further decrease the surface roughness of the polished surface of the magnetic disk substrate so as to have the surface less than 0.001 μm Ra and 5 nm (0.005 μm) Rmax.

Figure 10:
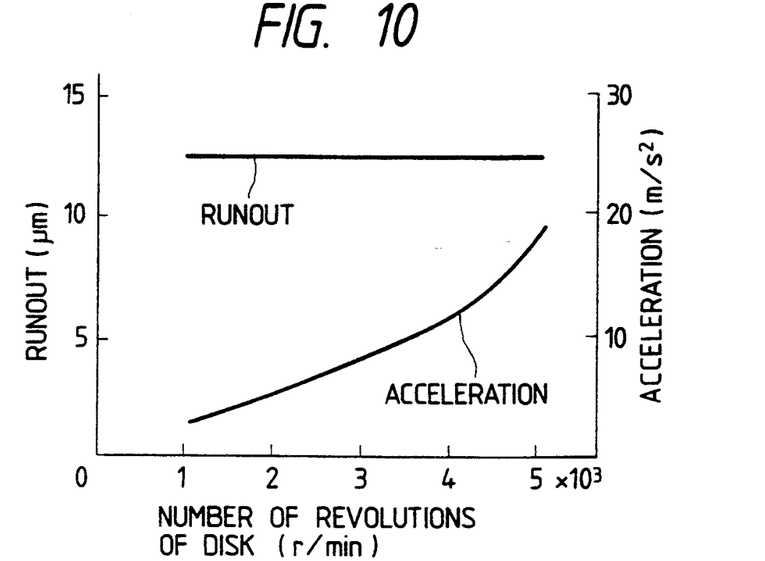
FIG. 10 is a characteristic view showing the relationship between the number of revolutions of disk, runout and acceleration.

Furthermore, the present inventors found that in order to decrease the head flying height and to fly the magnetic head in a stabilized manner, it is important to provide the surface roughness with higher precision and increase a plane degree representative of a surface shape of the magnetic disk. Particularly, in order to shorten the access time of the magnetic disk device, the magnetic disk is rotated at the high speed, i.e., 5000 or 7000 r/min or more as compared with 3600 r/min of prior art. As the dynamic shape precision of the disk surface is determined in order that the magnetic head is files in a stabilized manner with respect to the rotation of the disk, data of runout and must be considered acceleration. It has been found to as shown in FIG. 10, that the acceleration extremely rapidly increases in a disk of the same plane degree in accordance with the number of revolutions of disk.

Therefore, it is essential to improve the plane degree in order to achieve the stabilized head flying characteristic even at the high speed rotation. With respect to the shape precision of the substrate for the magnetic disk obtained a conventional polishing process, for example, in a typical Ni-P plated aluminum alloy substrate, the plane degree is 6.8 μm and standard deviation is 2.2 μm; and in a partly applied glass plate, the plane degree is 5.1 μm, and standard deviation is 1.3 μm. With respect to the flying characteristic of the magnetic disk using the aforementioned substrates, the head flying height is approximately 0.08 to 0.1 μm. It has been extremely difficult to obtain stabilized a head flying height of 0.08 μm or less.

Further, when the speed of desk is 3600 r/min the runout and acceleration representative of the dynamic surface precision of the magnetic disk are 1 to 15 μm and 1 to 5 m/s², respectively. From the foregoing, in order to decrease the flying height of the magnetic head and realize the magnetic disk corresponding to high recording density and excellent in sliding characteristics such as CSS characteristic, it is necessary to have a high precision substrate formed by a new process method different from a conventional process.

Figure 11:
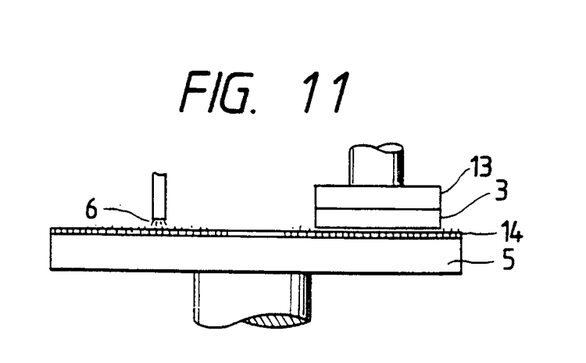

A typical one side polishing method for a disk substrate will be described with reference to FIG. 11. In the conventional one side polishing, as shown, a work (a substrate) 3 is adhered to a holder 13 with resin or the like, and one side of the work 3 is polished, after which the work 3 is disengaged from the holder 13 and then washed. Thereafter, the substrate is inverted and adhered to the holder, and the other side is polished in a manner similar to the former. Therefore, the processed surface is deformed by a strain caused by adhesion and an uneven strain resulting from processing of surface and back of the work surface to make it difficult to obtain a high precision plane degree. Moreover, the polisher 14 brings forth degradation resulting from a conventional mirror polishing, by polishing with the polisher 14 a sag tends to occur in a peripheral portion of the work due to viscoelastic deformation of the polisher caused by pressurization to make it difficult to obtain a high precision plane degree.

In addition to the aforementioned polishing method, as a method for separating a rotating surface plate from a substrate surface, causes abrasive grains to flow into a gap therebetween. Additionally by performing polishing in a non-contact state, a processing method called a float polishing has been known. This method can overcome the sag of the plane degree in the peripheral edge of the substrate thus overcoming the which has been defect of the conventional polishing, and float polishing can attain the surface roughness of a degree of an angstrom.

However, the greatest problem of this float polishing method is that one surface of a substrate is polished while the surface is adhered and fixed to a base, and therefore, double sides cannot be simultaneously processed and processing this float polishing method is limited to one side. Accordingly, this process can't be mass produced. Furthermore, when the substrate is inverted to process the other surface, the substrate is once again removed from the base, and the already polished flat surface is again adhered and fixed to the base. Therefore, particular care in handling so as not to produce a scratch is required impairing the automation of polishing process. Moreover, the simultaneous double side processing employing the float polishing has been said to be impossible in terms of technique and has been disregarded.

As previously mentioned, to attention given to a fine projection on the disk surface for stabilizing the flying characteristic and CSS characteristic of the magnetic head, the substrate having a conventional surface roughness and the decrease in fine projection is insufficient to deal with the stabilization of flying less than 0.08 $\mu$m of flying height. In this connection, it is necessary that the surface roughness of the substrate be less than 1 nm Ra, and the substrate is less than a few nmRmax. It is further required that the plane degree which is the surface shape of the magnetic disk be less than 1 $\mu$m, and the runout and acceleration are less than 1 $\mu$m and less than 1 m/s$^2$, respectively. In order to obtain such a magnetic disk, it is necessary to considerably improve the surface precision of the plane polishing of the substrate.

OBJECTS AND SUMMARY OF THE INVENTION

In view of the foregoing, an object of the present invention is to overcome the problems noted above with respect to conventional one side polishing method and float polishing process. A first object of the present invention is to provide a simultaneous double side processing method for a substrate by way of improved float polishing that can be applied to simultaneous double side polishing not only a magnetic disk but also general plate-like substrates. A second object of the present invention is to provide a simultaneous double side processing apparatus for a substrate. A third object of the present invention is to provide a polishing and processing method for a magnetic disk substrate using the aforesaid processing apparatus. A fourth object of the present invention is to provide a manufacturing method for a magnetic disk. A fifth object of the present invention is to provide a magnetic disk manufactured thereby.

In view of the necessity of considerable improvement of a smooth polishing technique for a flat plate represented by a substrate for a magnetic disk, in order to achieve these objects, the present inventors have thoroughly tested and studied the problems of the present polishing technique, and as a result reached a knowledge of enabling a practical use of a novel polishing method.

More specifically, the present invention has been achieved on the basis of the aforesaid knowledge. For high precision plane polishing of a thin disk such as a disk, a surface precision of a surface plate formed on a high plane is transferred to a processing surface of work in accordance with a maternal principle and double sides are simultaneously subjected to polishing. This is a simultaneous double side float polishing which has been considered to be difficult.

For achieving the aforesaid first object, a substrate in a predetermined surface state is rotatably held in advance between two upper and lower surface plates, which are independently rotatably, a carrier. A polishing liquid containing a polishing agent of predetermined grain size is scattered and supplied from a polishing liquid path provided in the vicinity of a rotational shaft of one of said surface plates.

A power is produced by the surface plate by rotation of the surface plate to fly the substrate between the upper and lower surface plates, and the polishing liquid supplied from the polishing liquid path is branched into two upper and lower layers by the carrier. The thus branched polishing liquids flow in the direction of the peripheral ends of the surface plates via the substrate from the neighborhood of the rotational shaft of the surface plate by the centrifugal force of the surface plate. The double sides of the substrate are simultaneously polished and processed in a non-contact state with the surface plates with the polishing liquid which flows between the substrate and the surface plates. This is the simultaneous double sides polishing and processing method for a substrate having a step of transferring the surface state of the surface plate to the substrate surface.

In order to hold the carrier on the substrate, holes are provided for mounting a plurality of substrates on the carrier and the member of holes are as many as substrates. The substrates are rotatably held independently of each other and do not contact each other by use of the aforesaid hole walls. It be is further desired that a polishing load is applied to said one rotating surface plate so that the distance between the substrate and the surface plate in which the polishing liquid flows is controlled to control the polishing amount of the substrate surface. The carrier may be fixed instead rotated. However, when the carrier is rotated, it is rotated in the reverse direction of the surface plate. In the case where the carrier is rotated in the same direction as that of the surface plate, the rotational speed of the carrier is lower than that of the surface plate to produce a power pressure based on a speed difference therebetween. The surface state of the surface plate is a suitable shape, but the surface roughness is 0.001 $\mu$m Ra or less, and the plane degree is 1 $\mu$m.

For achieving the second object, there is provided a simultaneous double sides polishing and processing apparatus comprising two upper and lower surface plates provided at regular intervals and rotated independently of each other for processing the substrate into a predetermined surface state in advance, a carrier provided between said surface plates and having a hole for rotatably holding a work, a polishing liquid supplying device provided in the vicinity of a rotational shaft of at least one of said surface plates, and a rotating and driving mechanism for rotating said surface plates. Dynamic pressure is produced on the surface plates by a turning force of said surface plates to rotates the substrate between the upper and lower surface plates, a polishing liquid supplied from said polishing liquid path is divided into two upper and lower layers by the carrier, said polishing liquid flows in the direction of the peripheral ends of the surface plates with respect to the substrate from the neighborhood of a rotational shaft of the surface plate by the centrifugal force of said surface plates, double sides of said substrate are simultaneously polished and processed without contacting surface plates with the polishing liquid flowing between the substrate and the surface plates, and the surface state of the surface plates is transferred to the substrate surface.

The carrier is formed from a tensed thin plate-like carrier, and a plane thereof is formed with a plurality of holes in which a plurality of works (substrates) are independently placed in a fixed spaced relation. The substrates placed in the holes are held between the surface plates and do not contact each other and rotatably through hole walls. It is further desired that a rotational shaft of the upper surface plate move up and down, and a soft loading mechanism supported by air cushion and adapted to apply a predetermined polishing load to the upper surface plate is disposed on a vertically moving shaft of said upper surface plate. The distance between the substrate and the surface plate, in which the polishing liquid flows, is controlled to a predetermined value to control the polishing and processing amount of the substrate surface. Preferably, after the polishing agent supplying device, discharges the polishing liquid the polishing liquid discharged out of the peripheral end of the rotating surface plate is recovered to form a polishing liquid circulating system for them supplying the discharge liquid to a polishing liquid path provided in the vicinity of the rotational shaft of the surface plate, and means for controlling the temperature of the polishing liquid is provided within the circulating system so that the temperature may be set to a suitable temperature. The surface state of the surface plate may be of a suitable shape. It is desired however that the surface roughness is less than 0.001 $\mu$mRa, and the plane degree is 1 $\mu$m.

The rotational shafts of the upper and lower surface plates may be driven independently on the same shaft or may be independently rotated in a spaced relation. It is necessary, however, that the upper and lower surface plates are rotated such that at least a part thereof spatially intersects, and a carrier is disposed so that the substrate is arranged at the intersection.

For achieving the third object, there is provided a polishing and processing method for a magnetic disk substrate, the method including the steps of rotatably holding a plurality of magnetic disks which have been processed in advance to a predetermined surface state between two upper and lower surface plates which are independently and rotatable provided of each other through a carrier, supplying a polishing liquid with polishing agents of predetermined grain size scattered by a polishing liquid path provided in the vicinity of a rotational shaft of at least one of said surface plates, producing dynamic pressure on said surface plate by a turning force of said surface plate to rotate said substrate between the upper and lower surface plates, dividing the polishing liquid supplied from said polishing liquid path into two upper and lower layers by said carrier, flowing said liquid to in the direction of the peripheral end of the surface plate via said substrate from the neighborhood of the rotational shaft of the surface plate by the centrifugal force of said surface plate, simultaneously polishing and processing double sides of said substrate by not contracting with said the surface plate with the polishing liquid flowing between the substrate and the surface plate, and transferring the surface state of the surface plate to the substrate surface.

Preferably, the surface roughness of the two upper and lower surface plates is less than 0.001 $\mu$mRa, and the plane degree is less than 1 $\mu$m, said magnetic disk substrate being formed of aluminum or aluminum alloy. It is desirable to provide the step of forming in advance a nickel-phosphorus plated film on the surface of the substrate.

For achieving the fourth object of the present invention, there is provided a manufacturing method for a magnetic disk, the method comprising the steps of surface polishing and processing the magnetic disk substrate having the step of rotatably holding a plurality of magnetic disks processed to a predetermined surface state in advance between two upper and lower surface plates provided rotatably independently of each other through a carrier, supplying a polishing liquid with polishing agents of predetermined grain size scattered via a polishing liquid path provided in the vicinity of a rotational shaft of at least one of said surface plates, producing dynamic pressure on said surface plate by a turning force of said surface plate to rotate said substrate between the upper and lower surface plates, branching the polishing liquid supplied from the polishing liquid path into two upper and lower layers by the carrier, flowing the liquid in the direction of the peripheral end of the surface plate via said substrate from the neighborhood of the rotational shaft of the surface plate by the centrifugal force of said surface plate, simultaneously polishing and processing double sides of said substrate by not contacting the surface plate with the polishing liquid flowing between the substrate and the surface plate, and transferring the surface state of the surface plate to the substrate surface; sequentially forming magnetic metal films and protective films on the substrate by a sputtering film forming method; and coating a lubricating film.

Preferably, the surface roughness of the two upper and lower surface plates is less than 0.001 $\mu$mRa, and the plane degree is less than 1 $\mu$m, the magnetic disk substrate being formed of aluminum or aluminum alloy. It is desirable to form the magnetic metal film by executing in advance the step of forming in advance a nickel-phosphorus plated film on the surface of the substrate, and the step of forming a cobalt-family magnetic alloy film.

For achieving the fifth object of the present invention, there is provided a magnetic disk having a magnetic film, a protective film and a lubricating film formed on a substrate, resulting in a surface roughness less than 0.001 $\mu$mRa and plane degree is less than 1 $\mu$m, preferably, an aluminum substrate subjected to Ni-P plating.

From solving the aforementioned problems, an example such that a substrate comprises a magnetic disk substrate has been described. However, the present invention can be effectively applied to other thin plates such as glass plates for a Si wafer and liquid crystal panel, glass plates for an exposure mask, for example and substrates the field in which the occurrence of strain is to be avoided as much as possible during polishing. The present invention makes use of the fact that the strain is hard to be formed in the substrate which is the feature of the simultaneous double sides polishing, and therefore is particularly effective for polishing a thin plate.

BRIEF DESCRIPTION OF THE DRAWINGS

FIG. 12 is a schematic view showing a one-side processing method for a substrate according to prior art.

DETAILED DESCRIPTION OF PREFERRED EMBODIMENTS

Typical embodiments according to the present invention will be described below by reference to the drawings.

Figure 3:
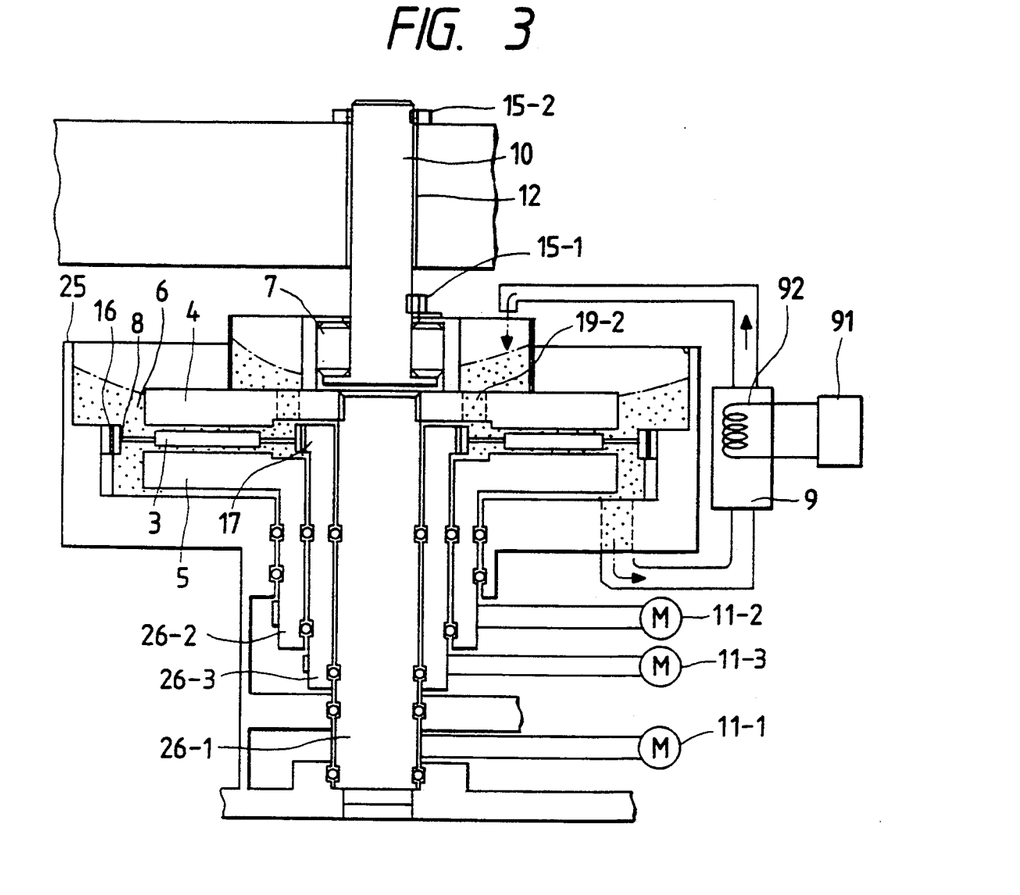
FIG. 3 is a schematic view of a processing apparatus showing one embodiment of a polishing method and a polishing apparatus according to the present invention.
Figure 4:
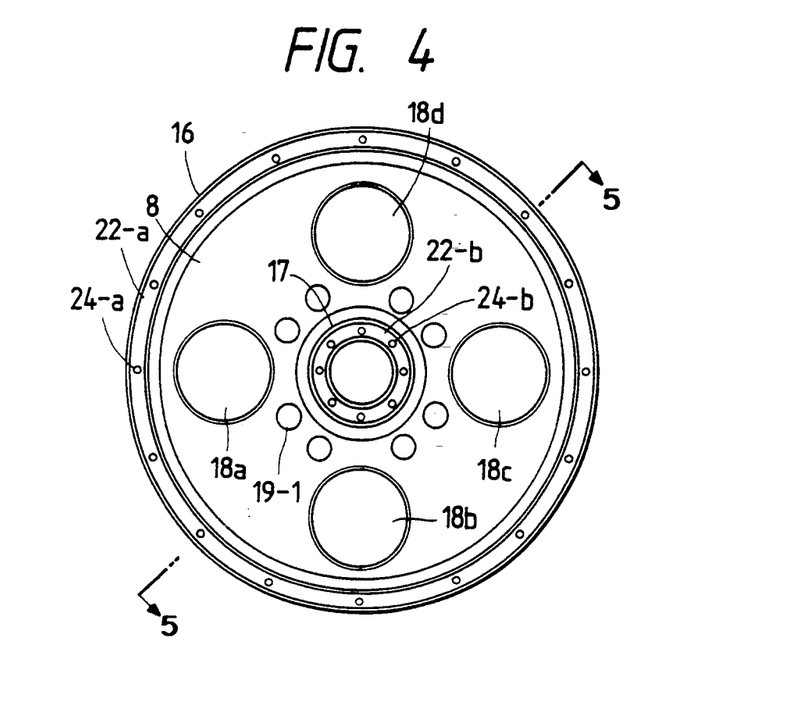
FIG. 4 is a plan view of a carrier shown in FIG. 3.
Figure 5:
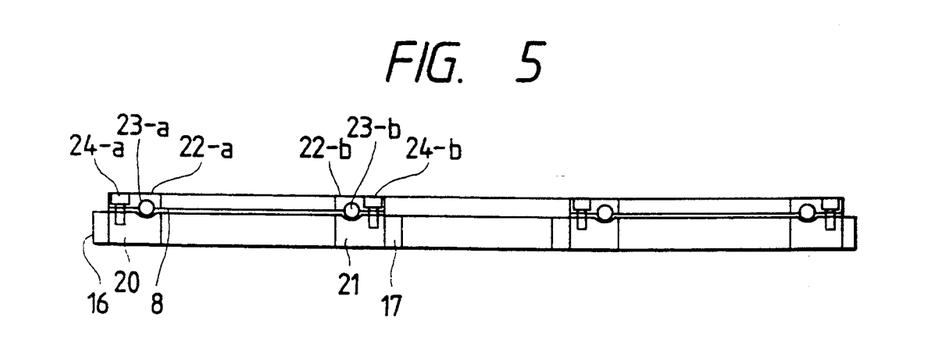
FIG. 5 is a sectional view taken on A—A' of FIG. 4.
Figure 6:
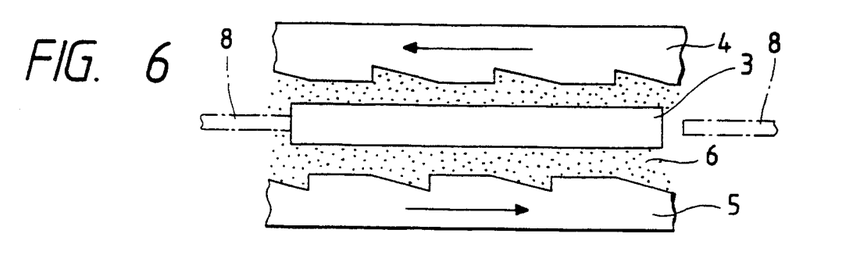
FIG. 6 is a sectional view showing the processing state of a processing method according to the present invention in the schematic form.

FIGS. 3 through 5 show one embodiment of a polishing apparatus according to the present invention. FIG. 3 is a schematic sectional view of main parts of the apparatus. FIG. 4 is a plan view of a carrier. FIG. 5 is a sectional view taken on line A—A' of FIG. 4.

In the polishing apparatus of the present invention, as shown in FIG. 3, a disk-like substrate 3 to be processed is rotatably held through a carrier 8 between upper and lower surface plates 4 and 5 to be rotated and driven and when exceeding a predetermined number of revolutions, the substrate flies to form a clearance between the surface plates 4 and 5. A polishing liquid with scattered polishing agents flows through the clearance by a centrifugal force caused by rotation of the surface plates whereby the polishing agents in the liquid impinge upon the substrate so that polishing is carried out.

More specifically, the apparatus comprises upper and lower surface plates 4 and 5 formed with a dynamic pressure producing surface in which a plane degree is corrected to 1 μm or less in advance and producing dynamic pressure by the relative speed with the substrate 3 and the polishing agent interposed between the substrates, a carrier 8 rotatably holding the substrate 3 between the upper and lower surface plates and branching the polishing liquid 6 flowing between the upper and lower surface plates 4 and 5 into two upper and lower layers, drive means for example 11-1, 11-2 and 11-3 for rotating the upper and lower surface plates 4 and 5 and the carrier 8, a soft loading mechanism 12 for lowering the upper surface plate 4, placing a light load in contact with the substrate 3 and gradually increasing an additional load with respect to the dynamic pressure action caused by the polishing agent produced in the substrate 3 as the upper surface plate 4 rotates, and a polishing agent supplying device 9 for supplying the temperature-controlled polishing liquid 6 to a polishing tank 25 for dipping the substrate and the upper and lower surface plates 4 and 5 into the polishing liquid 6 during the double sides polishing of the substrate 3. This polishing agent supplying device 9 is configured so that a heat medium heated or cooled by a heater 91 as a temperature control means is circulated in a heat exchanger 92, and a temperature of the polishing liquid is detected by a temperature detector not shown so as to always set the temperature to a predetermined temperature.

FIGS. 4 and 5 show the carrier 8 in detail. The carrier 8 arranged between a center gear 17 and an internal gear 16 is a metal plate sufficiently thinner than a substrate provided with a plurality, for example of holes 18 at regular intervals for rotatably holding the substrate 3, the metal plate being fixed, between an outer ring 20 and an inner ring 21, by being pulled by the outer ring 20 and the inner ring 21 by tightening an O-ring 23 with a bolt 24 through a keep ring 22. This carrier 8 is provided with a passage 19-1 in which the polishing agent 6 with the scattered polishing agent flows from top to bottom in the vicinity of a rotational shaft 26-3 similarly to the upper surface plate 4. This carrier 8 can be also rotated as necessary by an internal gear 16 and a center gear 17 formed internally of a polishing tank 25 through the rotational shaft 26-3.

The upper surface plate 4 is rotatably supported on a vertically movable shaft 10 by an air cushion 7 on one hand, and is rotated by the motor 11-1 through the rotational shaft 26-1 on the other hand. On the top of the upper surface plate is mounted a position sensor 15-1 which detects the contact between the upper surface plate 4 and the substrate 3 by downward movement of the vertically movable shaft 10 caused by the drive of the soft loading mechanism 12. The function of the soft loading mechanism 12 will be described in more detail. In setting the substrate 3 on the apparatus, the vertically movable shaft 10 is moved upward to facilitate mounting, and the substrate is placed into the hole 18 of the carrier 8, after which the substrate is roughly moved down to a predetermined position. At that time, the detection of the position is carried out by a position sensor 15-2. Then, the upper surface plate 4 is moved down to a position at which it comes into contact with the substrate in a fine mode of feed, and the contact state is detected by the position sensor 15-1. Thereafter, the upper surface plate is again moved upward in a fine mode of feed to form a predetermined clearance on the substrate 3, and stands-by for rotation of the surface plate. As just mentioned, the soft loading mechanism 12 has the function to move up and down the upper surface plate 4 through the vertically movable shaft 10 in two stages of rough and fine modes, however, to apply a predetermined load. Fine adjustment of alignment can be easily done by controlling pressure of the air cushion 7.

A method for polishing the substrate 3 using the polishing apparatus constructed as described above will be described hereinafter. Ni-P plating having a thickness of approximately 10 $\mu$m was applied in advance to an aluminum alloy disk, having an external diameter of $\phi$130 mm, an internal diameter of $\phi$40 mm and a thickness of 1.9 mm, which is a substrate for a magnetic disk as the substrate 3, of which double sides were ground and polished in a known manner to prepare a specimen substrate 3. Four such specimen substrates 3 were used. First, these substrates 3 are placed into holes 18 provided in a carrier 8 supported by an internal gear 16 and a center gear 17, and a commercially available coloidal silica polishing liquid 6 having grain size of 20 to 40 nm controlled to temperature of 293 K is supplied from a polishing agent path 19.

Adjustment of viscosity of the polishing liquid was carried out by adding pure water to a stock solution of coloidal silica to research a predetermined fluidity.

Next, the upper surface plate 4 was moved down by the vertically movable shaft 10 supported by the air cushion 7 to place the upper surface plate 4 in contact with the substrate surface. In detection of the contact position of the substrate surface by the downward movement of the vertically movable shaft 10, the position sensor 15 operates and the vertically movable shaft 10 automatically lowers and stops. The upper surface plate 4 is moved upward approximately 5 $\mu$m from the stop position by the air cushion 7, and the upper and lower surface plates 4 and 5 are rotated in directions opposite to each other within the polishing liquid 6, while the number of revolutions is set at 100 r/min. In this example, the center gear 17 is not rotated and the carrier 8 remains stopped. Thereby, the polishing liquid is branched into two layers by the carrier 8. Dynamic pressure W produced in an interface between the surface plate surface and the substrate surface by the polishing liquid present in the upper layer portion and the lower layer portion is in accordance with the following formula (1), and the surface plates and the substrate surface effect relative motion in the non-contact state. Namely, $$h = k \cdot (\mu UD/)^{\frac{1}{2}} W \quad (1)$$

wherein $\mu$ is the coefficient of viscosity of the polishing liquid; U is the relative speed between the surface plate and the substrate 3; D is the diameter of the substrate; h is the clearance between the substrate surface and the surface of the surface plate; and k is the coefficient of correction. Fine particles having the grain size of scores of nm in the polishing liquid repeatedly impinge upon the substrate surface, and fine raised portions on the substrate surface are gradually polished to improve the surface roughness. The shape of the surface of the surface plate corrected to have 1 $\mu$m of plane degree is transferred to the substrate surface, thus improving the plane degree of the substrate surface.

The estimated results of the surface precision of the substrate obtained by the aforementioned processing method will be described below.

(1) The measurement of the plane degree was carried out by a photo-interference type plane-degree measuring unit for example.

(2) The measurement of surface roughness was carried by a measuring unit—TARISTEP which is a product made by Rank Tailer Hobson Ltd.: stylus shape—0.1 $\mu$m$\times$2.5 $\mu$m.

The surface precision characteristic of the substrate obtained by the double sides polishing according to the present embodiment had the plane degree of 0.8 $\mu$m and the surface roughness of 0.6 nmRa, 5 nmRmax.

On the other hand, the characteristic of the substrate subjected to the double sides polishing by the conventional method as a comparative example had the plane degree of 5 $\mu$m and the surface roughness of 3 nmRa, 40 nmRmax. It has been confirmed that the effectiveness of the present invention was superior.

Figure 1:
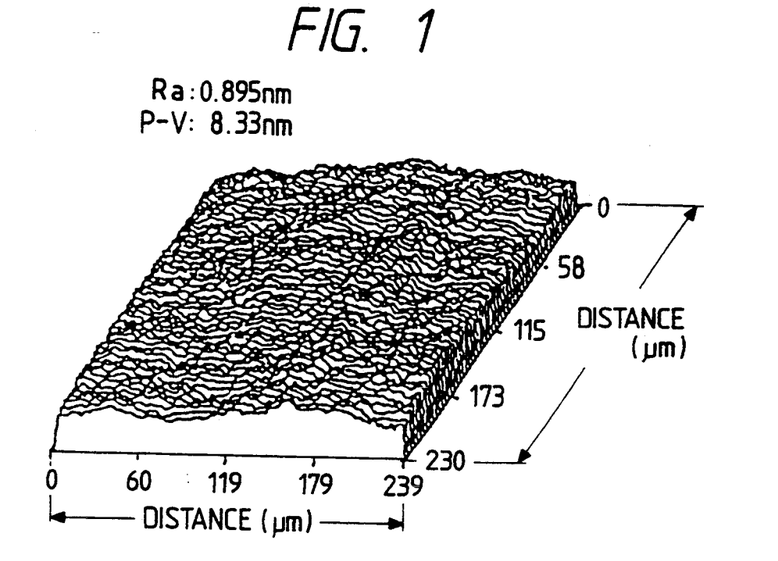
FIG. 1 is a schematic perspective view (three-dimensional representation) showing surface precision of a magnetic disk substrate according to one embodiment of the present invention.

With respect to one example of the surface precision of the substrate obtained by the present invention, the result of measurement of a non-contact fine surface by a surface measuring device, for example, the product name of made by WYKO is shown in FIG. 1.

Figure 2:
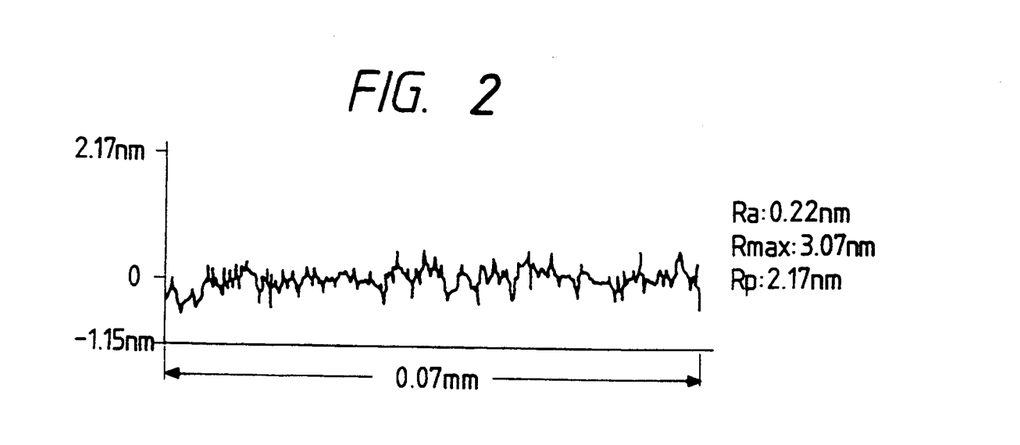
FIG. 2 is a graph showing the surface roughness of a magnetic disk substrate according to an embodiment of the present invention.

The result of the measurement of the surface roughness shape by a superprecision surface roughness meter for example, having a product more of made by Rank Tailer Hobson Ltd. is shown in FIG. 2. In these measurements, a substrate having a surface roughness of 1 n mRa or less, a few nmRmax or less was obtained.

In the aforementioned examples, in the apparatus shown in FIG. 3, polishing was carried out with the carrier 8 stopped. However, a similar substrate can be obtained even by rotating the center gear 17 and rotating the carrier 8 at a speed which is lower by a few r/min. After start of double side polishing, when a raised portion of the substrate is polished and a clearance between the substrate surface and the surface of the surface plate is larger than an initial set value, and when the clearance h is large as will be apparent from the formula 1, the dynamic pressure W is small, whereby a polishing load is small and polishing efficiency decreases. Therefore, the upper surface plate 4 is moved down so that as polishing time passes, the raised portion of the substrate surface is reduced and the surface plate is not in contact with the substrate to decrease a clearance between the surface of the surface plate and the substrate surface thus enabling improvement of the polishing efficiency.

While in the embodiments, a description has been made of an aluminum alloy substrate in which Ni-P plating is applied to a substrate material, it is to be noted that an aluminum substrate, a glass substrate and a ceramic substrate subjected to anode oxidization are similarly employed.

Next, a second embodiment will be described below. In this second embodiment, a description will be explained in which a magnetic disk was manufactured by use of a magnetic disk substrate obtained in the aforementioned first embodiment.

An intended magnetic disk was obtained by forming a Co-Cr family alloy film in a thickness of 50 nm as a magnetic film and a carbon protective film in a thickness of 40 nm sequentially on the magnetic disk substrate obtained in the first embodiment and further forming a lubricating film in a thickness of approximately 5 nm thereon. This magnetic disk was incorporated into the known magnetic disk device to examine the flying characteristic of the magnetic head.

As a result, as shown in Table 1 below, the runout and acceleration reached 1 μm or less and 1 m/s² or less respectively at the number of revolutions of disk of 3600 r/min to obtain the flying characteristic stabilized at the head flying height of 0.06 μm. The runout is the characteristic value in which a displacement of the rotating disk was measured by a non-contact displacement gauge, which corresponds to the estimation of the plane degree. The acceleration is the characteristic value obtained by differentiating the displacement amount, which corresponds to the estimation of the surface roughness.

In the CSS test which is the driving system of the magnetic disk device, since the sliding of the magnetic disk on the disk surface is stabilized, less damage occurs in the disk. The CSS test was performed 30,000 times or more in a stabilized manner.

Figure 12A:
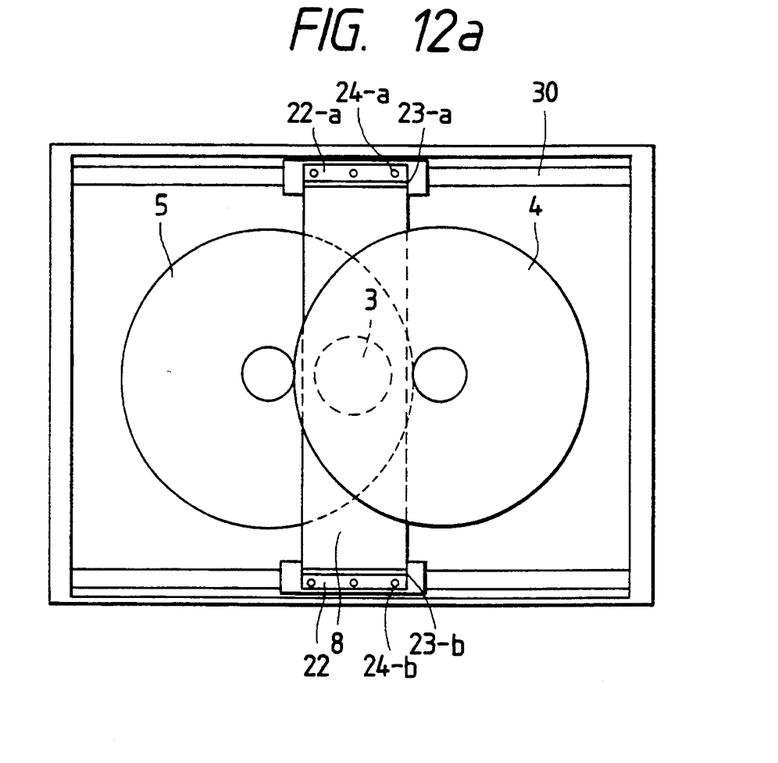
FIGS. 12a and 12b are respectively schematic views of a further modified processing apparatus of the polishing method and polishing apparatus according to the present invention.
Figure 12B:
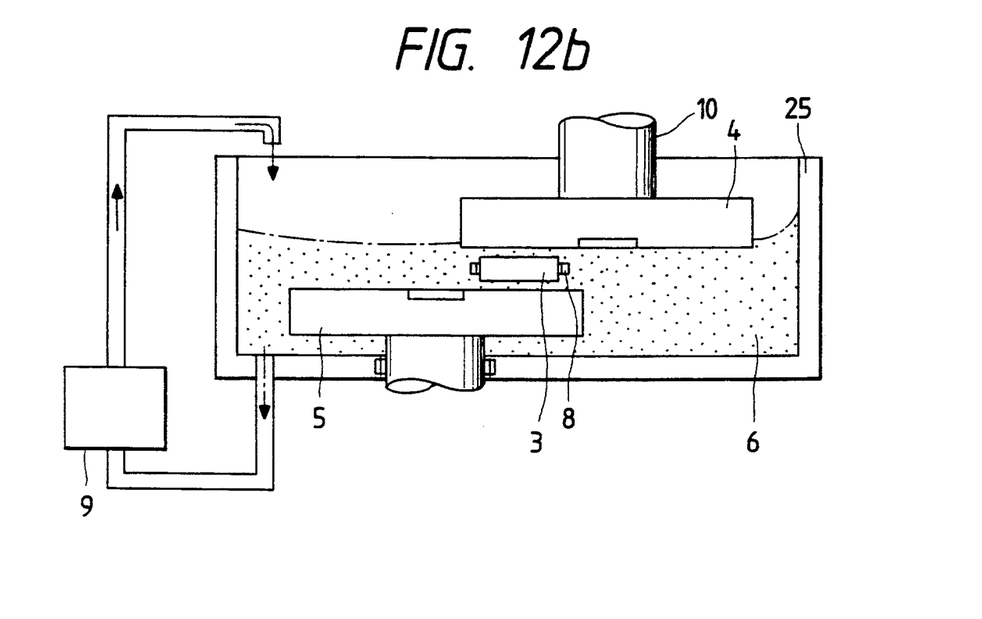

FIG. 12 shows a third embodiment of the polishing method and polishing apparatus according to the present invention, which is a modified example shown in FIG. 3 in the Embodiment 1. FIG. 12a is a plan view, and FIG. 12b is a sectional view. This apparatus comprises a web-like carrier 8 disposed between upper and lower surface plates arranged so that rotational shafts of the upper and lower surface plates 4 and 5 are deviated and halves of the surface plates overlap a hole formed in the central portion of the carrier 8 to rotatably hold the substrate 3, a guide slide 30 oscillated between the surface plates, an oscillation driving mechanism (not shown), and a polishing agent supplying device 9 for polishing the upper and lower surface plates and the carrier in the polishing liquid.

By the double sides polishing apparatus constructed as described above, the substrate is placed in the hole of the carrier 8, and the upper surface plate 4 is moved down to form a predetermined clearance between the upper surface plate 4 and the substrate 3. The polishing liquid 6 of which temperature is controlled is supplied, and the upper and lower surface plates 4 and 5 are rotated to thereby produce dynamic pressure between the surface plate and the substrate so that the substrate and the surface plate perform the relative motion in the non-contact state. Fine abrasive grains in the polishing liquid repeatedly impinge upon the surface of the substrate 3 to scrape off raised portions on the substrate surface. Thus, the surface roughness is improved, and the high precision surface plate is transferred to thereby improve the shape precision of the substrate.

Even if the double sides of the substrate are polished while finely oscillating the carrier on which the substrate is rotatably held along the guide slide, the substrate surface can be likewise polished with high precision.

As described above, according to the present invention, the double sides of the substrate can be simultaneously polished and processed in the non-contact state with the surface plates to enable realization of the simultaneous double side float polishing that has been heretofore considered impossible. This is extremely significant. Particularly, a conventional fatal problem in that a large processing strain remains in the substrate by the surface polishing of a thin plate can be remarkably decreased by the present invention which effectively utilizes the feature of the simultaneous double side float polishing.

As an example of the specific effect, by using, as a sputter magnetic disk, a substrate having a surface which has a high plane degree and high precision whose surface roughness is less than 1 nmRa, a head flying height can be considerably lowered corresponding to high density recording, and the recording density can be remarkably increased. Furthermore, by improvement of the runout and acceleration of the magnetic disk, the flying stability of the magnetic head is improved, and in addition, a damage caused by head sliding in the CSS is decreased to enable considerable improvement of anti-sliding characteristic of the magnetic disk. Particularly, the effect of the head flying stability and sliding reliance is great with respect to high speed rotation of the magnetic disk in view of the need of shortening access time of the magnetic disk device.

We claim:

1. A method for simultaneously polishing double sides of a substrate, the method comprising the steps of:
   rotatably holding said substrate, which has been processed in advance to a first surface state, in a carrier spaced between an upper surface plate and a lower surface plate, said upper surface plate, said lower surface plate and said carrier being rotatable independent of each other,
   supplying a polishing liquid with scattered polishing agent therein through a polishing liquid path provided adjacent to a rotational shaft of at least one of said upper and lower surface plates,
   branching the polishing liquid supplied from said polishing liquid path into an upper layer and a lower layer by said carrier,
   rotating said upper surface plate and said lower surface plate in directions opposite to each other,
   making the polishing liquid branched into said upper layer flow into a first clearance between said upper surface plate and an upper side of said substrate rotatably held through said carrier and the polishing liquid branched into said lower layer flow into a second clearance between a lower side of said substrate rotatably held through said carrier and said lower surface plate by centrifugal forces of the rotation of said upper and lower surface plates, so that said substrate is caused to float in the polishing liquid flowing in said upper and lower layers without contacting said upper and lower surface plates by a dynamic pressure produced by the flow of the polishing liquid branched into said upper and lower layers respectively flowing through said first and second clearances, and,
   simultaneously polishing the upper and lower sides of said substrate with said polishing liquid without contacting said upper and lower surface plates with said substrate, said polishing liquid branched into said upper and lower layers respectively flowing, through said first and second clearance.

2. The method according to claim 1, wherein said step of rotatably holding the substrate on said carrier includes providing a number of holes corresponding to a number of a plurality of substrates the substrates to be placed on the carrier, the substrates being rotatably held through walls of said holes without contacting each other.

3. The method according to claim 1, further comprising the steps of applying a polishing load to one of said rotating surface plates, and thereby controlling the distance between the substrate and the surface plate for flowing the polishing liquid to control a polishing and processing amount of the substrate surface.

4. The method according to claim 1, including the step of rotating the carrier in a direction opposite to the direction of rotation of one of the upper surface plate and the lower surface plate.

5. The method according to claim 1, wherein the state of a surface of at least one of said upper and lower surface plates facing said substrate during said polishing is a surface roughness of 0.001 μmRa and a plane degree of 1 μm, and wherein the polishing step further comprises the step of transferring said surface state of said at least one said upper and lower surface plates to the substrate surface.

6. A method for polishing magnetic disk substrates comprising the steps of:
rotatably holding a plurality of magnetic disk substrates, which have been processed in advance to a first surface state, in a carrier spaced between an upper surface plate and a lower surface plate, each of said upper surface plate, said lower surface plate and said carrier being rotatable independent of each other,
supplying a polishing liquid with a scattered polishing agent therein through a polishing liquid path provided adjacent to a rotational shaft of at least one of said upper and lower surface plates,
branching the polishing liquid supplied from said polishing liquid path into an upper layer and a lower layer by said carrier,
rotating said upper surface plate and said lower surface plate in directions opposite to each other,
making the polishing liquid branched into said upper layer flow into a first clearance between said upper surface plate and an upper side of the magnetic disk substrates rotatably held through said carrier and the polishing liquid branched into said lower layer flow into a second clearance between a lower side of said magnetic disk substrates rotatably held through said carrier and said upper and lower surface plates, so that said magnetic disk substrates are caused to float in the polishing liquid flowing in said upper and lower layers without contacting said upper and lower surface plates by a dynamic pressure produced by the flow of the polishing liquid branched into said upper and lower layers respectively flowing through said first and second clearances, and
simultaneously polishing the upper and lower sides of said magnetic disk substrates with said polishing liquid without contacting said substrates with said upper and lower surface plates, said polishing liquid branched into said upper and lower layers respectively flowing through said first and second clearances.

7. The method according to claim 6, wherein the state of each of the surfaces of said upper and lower surface plates facing said substrates during said polishing is a surface roughness of 0.001 μmRa or less and a planar degree of 1 μm or less, and wherein the method further comprises the step of forming said magnetic disk substrates of aluminum or aluminum alloy and a surface of the magnetic substrates being formed in advance with a nickel-phosphorus plated film.

8. A method for simultaneously polishing double sides of a substrate, the method comprising the steps of:
rotatably holding said substrate, which has been processed in advance to a first surface state, in a carrier spaced between an upper surface plate and lower surface plate, said upper surface plate, said lower surface plate and said carrier being rotatable independent of each other,
supplying a polishing liquid with scattered polishing agent having a grain size of 20 to 40 nm therein through a polishing liquid path provided adjacent to a rotational shaft of at least one of said upper and lower surface plates,
branching the polishing liquid supplied from said polishing liquid path into an upper layer and a lower layer by said carrier,
rotating said upper surface plate and said lower surface plate in directions opposite to each other,
making the polishing liquid branched into said upper layer flow into a first clearance between said upper surface plate and an upper side of said substrate rotatably held through said carrier and the polishing liquid branched into said lower layer flow into a second clearance between a lower side of said substrate rotatably held through said carrier and said lower surface plate by centrifugal forces of the rotation of said upper and lower surface plates, so that said substrate is caused to float in the polishing liquid flowing in said upper and lower layers without contacting said upper and lower surface plates by a dynamic pressure produced by the flow of the polishing liquid branched into said upper and lower layers respectively flowing through said first and second clearances, and,
simultaneously polishing the upper and lower sides of said substrate with said polishing liquid without contacting said upper and lower surface plates with said substrate, said polishing liquid branched into said upper and lower layers respectively flowing, through said first and second clearance.

9. A method for polishing magnetic disk substrates comprising the steps of:
rotatably holding a plurality of magnetic disk substrates, which have been processed in advance to a first surface state, in a carrier spaced between an upper surface plate and a lower surface plate, each of said upper surface plate, said lower surface plate and said carrier being rotatable independent of each other,
supplying a polishing liquid with a scattered polishing agent having a grain size of 20 to 40 nm therein through a polishing liquid path provided adjacent to a rotational shaft of at least one of said upper and lower surface plates,
branching the polishing liquid supplied from said polishing liquid path into an upper layer and a lower layer by said carrier,
rotating said upper surface plate and said lower surface plate in directions opposite to each other,
making the polishing liquid branched into said upper layer flow into a first clearance between said upper surface plate and an upper side of the magnetic disk substrates rotatably held through said carrier and the polishing liquid branched into said lower layer flow into a second clearance between a lower side of said magnetic disk substrates rotatably held through said carrier and said upper and lower surface plates, so that said magnetic disk substrates are caused to float in the polishing liquid flowing in said upper and lower layers without contacting said upper and lower surface plates by a dynamic pressure produced by the flow of the polishing liquid branched into said upper and lower layers respectively flowing through said first and second clearance, and simultaneously polishing the upper and lower sides of said magnetic disk substrates with said polishing liquid without contacting said substrates with said upper and lower surface plates said polishing liquid branched into said upper and lower layers respectively flowing through said first and second clearances.

* * * * *